Figure 1:
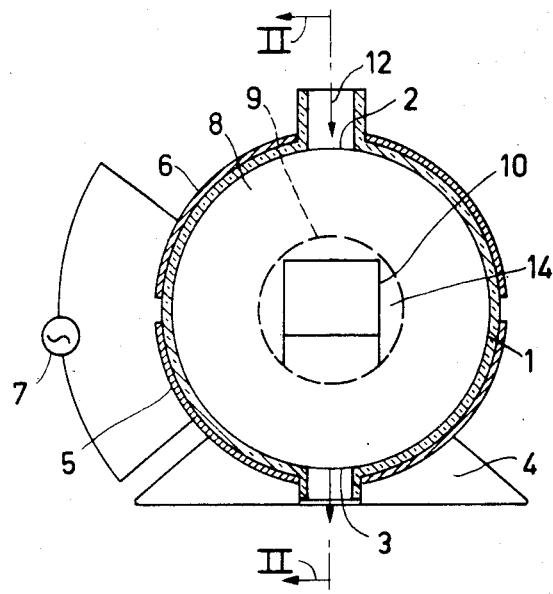

United States Patent [19]

Martens et al.

[11] Patent Number: 4,536,415

[45] Date of Patent: Aug. 20, 1985

[54] METHOD OF MANUFACTURING AN OPTICALLY READABLE INFORMATION DISC

[75] Inventors: Theodorus H. G. Martens; Franciscus H. M. Sanders, both of Eindhoven, Netherlands

[73] Assignee: U.S. Philips Corporation, New York, N.Y.

[21] Appl. No.: 480,196

[22] Filed: Mar. 30, 1983

[30] Foreign Application Priority Data

Feb. 4, 1983 [NL] Netherlands ............................ 8300422

[51] Int. Cl.³ .............................................. B05D 3/14
[52] U.S. Cl. ...................................... 427/40; 427/162; 427/164
[58] Field of Search ........................ 427/40, 162, 164; 204/164, 165; 428/461

[56] References Cited

U.S. PATENT DOCUMENTS

| | | | |
|---|---|---|---|
| 3,309,299 | 3/1967 | Mantell | 427/40 |
| 3,526,583 | 9/1970 | Hayward | 204/165 |
| 3,627,609 | 12/1971 | Bragole | 204/159.11 |
| 3,686,018 | 8/1972 | Lindblom et al. | 427/40 |
| 4,072,769 | 2/1978 | Lidel | 427/40 |
| 4,192,706 | 3/1980 | Horiike | 204/164 |
| 4,232,057 | 11/1980 | Ray et al. | 427/39 |
| 4,296,158 | 10/1981 | Lewis | 427/54.1 |
| 4,337,279 | 6/1982 | Polak | 427/40 |
| 4,345,005 | 8/1982 | All et al. | 428/461 |
| 4,422,907 | 12/1983 | Birkmaier et al. | 427/40 |

Primary Examiner—John H. Newsome
Attorney, Agent, or Firm—Norman N. Spain

[57] ABSTRACT

A method of manufacturing an optically readable information disc in which a disc-shaped substrate of a synthetic resin which comprises an optically readable structure on at least one side is treated with an oxidizing gas of reactive, electrically neutral particles and is then provided on the side of the structure with a non-electrolytic deposited reflection layer.

3 Claims, 2 Drawing Figures

U.S. Patent  Aug. 20, 1985  4,536,415

METHOD OF MANUFACTURING AN OPTICALLY READABLE INFORMATION DISC

The invention relates to a method of manufacturing an optically readable information disc which comprises a disc-shaped substrate manufactured from a synthetic resin or comprising a coating layer of a synthetic resin and which disc comprises on at least one side an optically readable structure of information areas situated alternately at a higher level and at a lower level.

Such a method is known, for example, from published Netherlands Patent Application No. 7611395 in the name of Applicants. According to this method a liquid, curable monomer composition comprising for example acrylates is applied on the surface of a disc comprising the negative of the optical structure. A supporting plate (substrate) is laid on the layer of the monomer composition, The layer is cured and the assembly of substrate and attached cured layer is removed from the disc. The resulting information disc thus comprises a supporting plate which on one side has a layer of a light-cured synthetic resin in which an optically readable information track is copied. The track has a crenellated profile of information areas situated at a lower level and at a higher level. The structure is very fine. For example, the difference in height between the information areas is 0.1–0.2 $\mu$m. The longitudinal dimensions vary from approximately 0.3–3 $\mu$m. Other processes of manufacturing optically readable information carriers are an injection moulding process or a compression moulding process. According to these processes a liquid thermoplastic polymer, for example, polymethylmethacrylate or polycarbonate, is provided at high temperature and pressure in a mould which is provided with at least one disc the surface of which has a structure which is the negative of the optical structure to be provided in the synthetic resin.

A reflection layer, for example a metal layer of Ag or Al, is provided on the synthetic resin on the side of the optical structure. The metal layer must be applied by means of a non-electrolytic deposition process. A suitable process is a physical process, for example, vapour deposition or sputtering. A problem with such methods is that the fine optical structure can be damaged during the vapour deposition or sputtering as a result of among other factors the thermal load. Another problem with such methods relates to the bonding between the metal layer and underlying layer of synthetic resin.

The metal layer may also be provided by means of an electroless chemical deposition process in which the surface of the synthetic resin is treated simultaneously or successively with an aqueous solution of a metal salt, for example an ammoniacal silver salt solution, and an aqueous solution of a reduction agent, for example, formaldehyde or sodium gluconate. Reference is made to "The Technology of aerosol plating" by Donald J. Levey in Techn. Proceed. 51st Annual Convention Americal El. Society, June 14–18, St. Louis 1964 (pages 139–149). The metal layer provided by the above chemical deposition process also shows the problem of the poor bonding. The bonding can be improved by pretreating the surface of synthetic resin with rather agressive chemical agents, for example permanganates or bichromates, as a result of which the surface is roughened. The optical structure present on the surface, however, is attacked in such manner that the structure is no longer optimally readable. The chemical roughening method is hence not very suitable for surfaces of synthetic resin having an optically readable, very fine structure. Moreover, the removal of the remainder of the chemical agent which adheres to the surface of synthetic resin, presents considerable problems.

In Netherlands Patent Application No. 8103375 of applicants a process is described of manufacturing an optically readable information carrier which is provided with a readily adhering metal layer without the optical structure being deformed or attacked. The process is restricted to a chemical metallisation process and to a special type of substrate, namely a substrate which is manufactured by polymerization of a mixture of monomeric acrylates and an N-substituted pyrrolidone compound.

It is the object of the invention to provide a method of manufacturing optically readable information carriers which do not present the above-mentioned disadvantages.

According to another object, a readily adhering reflection layer is provided on a substrate of a synthetic resin which carries an optically readable structure without deformation or other degradation of the structure.

According to another object a well adhering reflection layer, particularly a metal layer is obtained either by using a physical process, for example vapour deposition or sputtering, or by means of a chemical metallisation process.

Still another object is to provide a well adhering reflective layer on several types of synthetic resin materials, for example polycarbonate, polymethylmethacrylate, polysulphone, polyacrylate and polyvinyl chloride.

These objects are achieved according to the invention by means of a method of the type described in the opening paragraph which is characterized in that the substrate on the side of the optical structure is treated with an oxidizing gas of reactive, electrically neutral particles and the surface thus treated is then provided with a reflection layer by non-electrolytic deposition.

The treatment with the oxidizing gas can be carried out by placing or moving the substrate in the gas flow. The gas pressure used is low and is, by way of example, between 100 and 5000 mtorr. A suitable operating pressure is for example 300–800 mtorr. The gas flow may be varied and is, for example, 10–1000 sccm in particular 100–500 sccm. The unit sccm means standard cubic centimeter per minute. A standard cc is a cubic centimeter converted to standard temperature and pressure. An elevated temperature is preferably used in the oxidizing gas, for example, a temperature from 100°–121° C., in particular from 105°–110° C. The treatment time is approximately 1–30 minutes. At any rate the temperature of the oxidizing gas must be lower than the softening temperature of the resin of the substrate.

As already said the process according to the invention meets with the above-mentioned objects. A further advantage of the process is that it can easily be automated due to the gaseous character of the treatment.

In a preferred embodiment of the method in accordance with the invention the substrate is treated with an oxidizing gas which comprises atomic oxygen and/or oxygen molecules which are in an excited condition.

It has been found that the substrates having an optical structure sometimes show an extra undesired structure which is superimposed upon the optical structure. This extra structure is probably the result of the manufacturing process of the substrate and has an adverse influence on the quality of the optical structure. The extra structure comprises minimum bosses in the substrate material in the form of veins. The structure is termed autumn leaf structure. It has been found that as a result of the treatment with an oxidizing gas which comprises atomic oxygen or excited oxygen molecules, the autumn leaf structure does not occur so that the optical structure is improved.

The oxidizing gas of reactive, electrically neutral particles, in particular the above-mentioned oxygen particles, is preferably the product of a low-pressure high-frequency plasma from which the ionic constituents have been removed.

In a further preferred embodiment of the method in accordance with the invention a low-pressure HF plasma of an oxygen-containing gas is used which also comprises a halogen-containing compound in which the ionic constituents have been removed from the plasma.

A halogen-containing compound is to be understood to mean herein a fluorine-containing compound or a chlorine-containing compound. Examples hereof are $F_2$, $Cl_2$, $SF_6$, $SF_5Cl$, $NF_3$, fluoroalkyl and chloroalkyl, for example, $CF_4$, $CF_3Cl$, $CF_2Cl_2$, $SFCl_3$ and $CCl_4$, or mixtures thereof. Mixtures of the above compounds with inert gases are also useful, for example, mixtures with rare gases or with $N_2$.

A plasma of oxygen, nitrogen oxide, carbon dioxide or mixtures thereof comprising 10–50% by volume of a halogen-containing compound, the ionic constituents being removed from the plasma has been found to be very useful.

Very good results are obtained in particular with a plasma of oxygen comprising 10–30% by volume of $CF_4$ and which comprises no ionic constituents.

By adding a halogen-containing compound to the plasma the quantity of neutral, reactive particles, for example in particular oxygen radicals and excited oxygen molecules, is increased as a result of which the treatment time of the substrate can be reduced.

The separation of the ionic constituents can be realised in a simple manner by passing the plasma which is obtained in the usual manner by means of electrodes coupled to an RF (radiofrequency) generator, through a fine-meshed metal screen. The ionic constituents, in contrast with the reactive, electrically neutral particles cannot pass through the screen. The screen may have the form of a Faraday cage provided in the plasma reactor within which the substrates to be treated are placed. The substrates may also be treated in a compartment separated from the plasma reactor. The electrically neutral reactive constituents formed in the plasma are conveyed to the separate compartment via a pipe connection. Plasma reactors having an internal Faradey cage or having an above-mentioned separate compartment are known as such and are commercially available, for example, under the tradenames of Branson and Tokuda.

If the ionic constituents are not removed from the plasma the optical structure will be attacked during the treatment of the substrate.

The treated substrates are provided by means of the usual non-electrolytic deposition processes with a reflection layer, in particular a metal layer, for example, an Ag layer or an Al layer. Suitable processes are a vapour deposition process, a sputtering process or a chemical metallisation process. The resulting metal layers show a permanent excellent bond.

Figure 2:
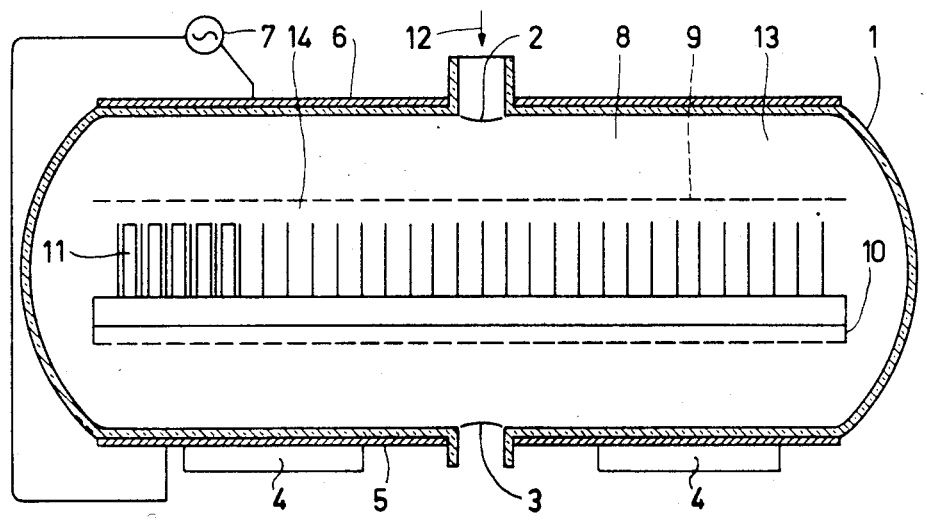

The invention will now be described in greater detail with reference to specific embodiments and the drawing, in which FIG. 1 is a cross-sectional view through a plasma reactor and FIG. 2 is a longitudinal sectional view of the reactor shown in FIG. 1.

Reference numeral 1 in FIG. 1 denotes a cylindrical reactor vessel of quartz glass. The vessel comprises an inlet aperture 2, an outlet aperture 3 and a supporting member 4. Two semi-cylindrical mutually separated capacitive electrodes 5, 6 are accommodated on the outer wall of the reactor vessel. The electrodes 5, 6 are electrically connected to an RF plasma generator 7. A cylindrical body 9 of metal gauze, a so-called Faraday cage, is present within the space 8 bounded by electrodes 5, 6. A holder 10 for substrate 11 (FIG. 2) is placed in said cage.

FIG. 2 is a cross-sectional view taken on the line II—II (FIG. 1). The same reference numerals are used for the same components as in FIG. 1.

The reactor is evacuated by means of a vacuum pump. The gas indicated by an arrow 12 is introduced into the reactor via inlet aperture 2. The gas is led out of the reactor via outlet aperture 3. The gas inlet is controlled by means of a flow control, not shown, and the outlet is controlled by means of a pump, not shown. The gas volume flow is 250 sccm. The gas pressure is adjusted at 500 mtorr. If desired, the gas pressure can be varied between 100 and 2000 mtorr by variation of the gas volume flow. The composition of the gas is recorded in column 1 of the table below.

The electrodes 5, 6 are coupled to the RF plasma generator 7 which has an adjustable power of from 0 to 1000 W. The power is set at a value of 100 W. A plasma 13 is formed in space 8. Dependent on the composition of the gas used, the plasma comprises a large quantity of reactive particles which may be charged electrically, for example excited oxygen ions or electrons and electrically neutral particles, for example excited oxygen molecules and atomic oxygen. The Faraday cage 9 obstructs the electrically charged particles for the greater part so that substantially only the neutral plasma constituents can enter into the space 14 present within the cage 9. The equilibrium temperature of the plasma is 105°–110° C. Substrates 11 of synthetic resin having an optical structure on at least one side are placed in the holder 10. The substrates are then treated with the electrically neutral particles of the plasma for the time indicated in column 2 of the following table. The type of synthetic resin from which the substrate is manufactured is recorded in column 3 of the table, in which PC means polycarbonate and PMMA means polymethylmethacrylate.

After the recorded treatment time the substrates are removed from the reactor. Each substrate is then provided with a metal layer on the side of the optical structure. Both a physical deposition process (vapour deposition and sputtering) and an electroless chemical metallisation process were used. In column 4 the process of deposition is indicated by the abbreviation PH for physical and CH for chemical. In the physical process an Al reflection layer was provided; in the chemical process an Ag layer was provided.

The information disc was subjected to a cyclic moisture test. According to this test the discs were stored for a test period of three weeks at periodically varying climatological conditions. For this purpose the discs were placed in a climate hood and subjected to a temperature cycle and moisture cycle per 24 hours, the discs being kept at a temperature of 45° C. for 8 hours at a relative humidity of 70–90% and for a period of 16 hours at a temperature of 25° C. at a relative humidity of 100%.

After the cyclic moisture test the bonding of the reflection layer was determined in a so-called diamond scratching test. According to this test, 12 scratches are provided in the surface of the reflection layer so as to extend over the whole thickness of the reflection layer. The pattern of scratches comprises 6 parallel scratches having a mutual distance of 1 mm which are crossed at right angles by likewise 6 scratches having a mutual distance of 1 mm, so that the pattern comprises 25 areas of 1 mm². An adhesive strip (cellotape) is pressed on the pattern of scratches and is then pulled off from the surface. With a good bonding the adhesive strip comprises no material removed from the surface. In column 4 of the table are recorded, besides the abbreviation PH or CH, the results of the bonding experiment used after the moisture test, + being a good bonding and − being a bad bonding. In the latter case material was removed from the surface of the information disc by the adhesive strip.

TABLE

| gas composition | treatment time in min. | type of substrate | results bonding test | |
|---|---|---|---|---|
| | | | PH metallisation | CH—metallisation |
| $O_2$ | 10 | PC | + | + |
| $O_2$ | 2 | PMMA | + | + |
| $O_2$ | 20 | PC | + | + |
| $O_2$ | 30 | PC | + | + |
| $O_2$ + 15% $CF_4$ | 2 | PC, PMMA | + | + |

TABLE-continued

| gas composition | treatment time in min. | type of substrate | results bonding test | |
|---|---|---|---|---|
| | | | PH metallisation | CH—metallisation |
| $O_2$ + 15% $CF_4$ | 5 | PC | + | + |
| $O_2$ + 15% $CF_4$ | 10 | PC | + | + |
| $O_2$ + 30% $CF_4$ | 2 | PC | + | + |
| $O_2$ + 30% $CF_4$ | 4 | PC | + | + |
| $O_2$ + 15% $CF_3Cl$ | 2 | PC | + | + |
| $O_2$ + 15% (He/5% $F_2$) | 2 | PC | + | + |
| NO | 2 | PC | + | + |
| NO + 15% (He/5% $F_2$) | 2 | PC | + | + |
| $CO_2$ | 2 | PC | + | + |
| $CO_2$ + 15% (He/5% $F_2$) | 2 | PC | + | + |
| $N_2$ | 2 | PC | + | −[1] |
| $N_2$ + 15% $CF_4$ | 2 | PC | + | −[1] |

[1] Good results are still obtained if the information disc is not subjected to the cyclic moisture test.

What is claimed is:

1. A method of manufacturing an optically readable information disc which comprises a disc-shaped substrate manufactured from a synthetic resin or comprising a coating layer of a synthetic resin and having on at least one surface thereof an optically readable structure of information areas situated alternatively at a higher level and at a lower level, characterized in that the substrate, on the surface having the optical structure, is treated with an ion free, low-pressure high-frequency plasma of an oxidizing gas containing a halogen compound and the thus treated surface is then provided with a non-electrolytic deposited metal reflection layer.

2. A method as claimed in claim 1, characterized in that a plasma of oxygen, nitrogen oxide or carbon oxide or a mixture thereof which comprises 10–50% by volume of a halogen-containing compound is used in which the ionic constituents have been removed from the plasma.

3. A method as claimed in claim 2, characterized in that a plasma of oxygen is used which comprises 10–30% by volume of $CF_4$, in which the ionic constituents have been removed from the plasma.

* * * * *